UNITED STATES PATENT OFFICE.

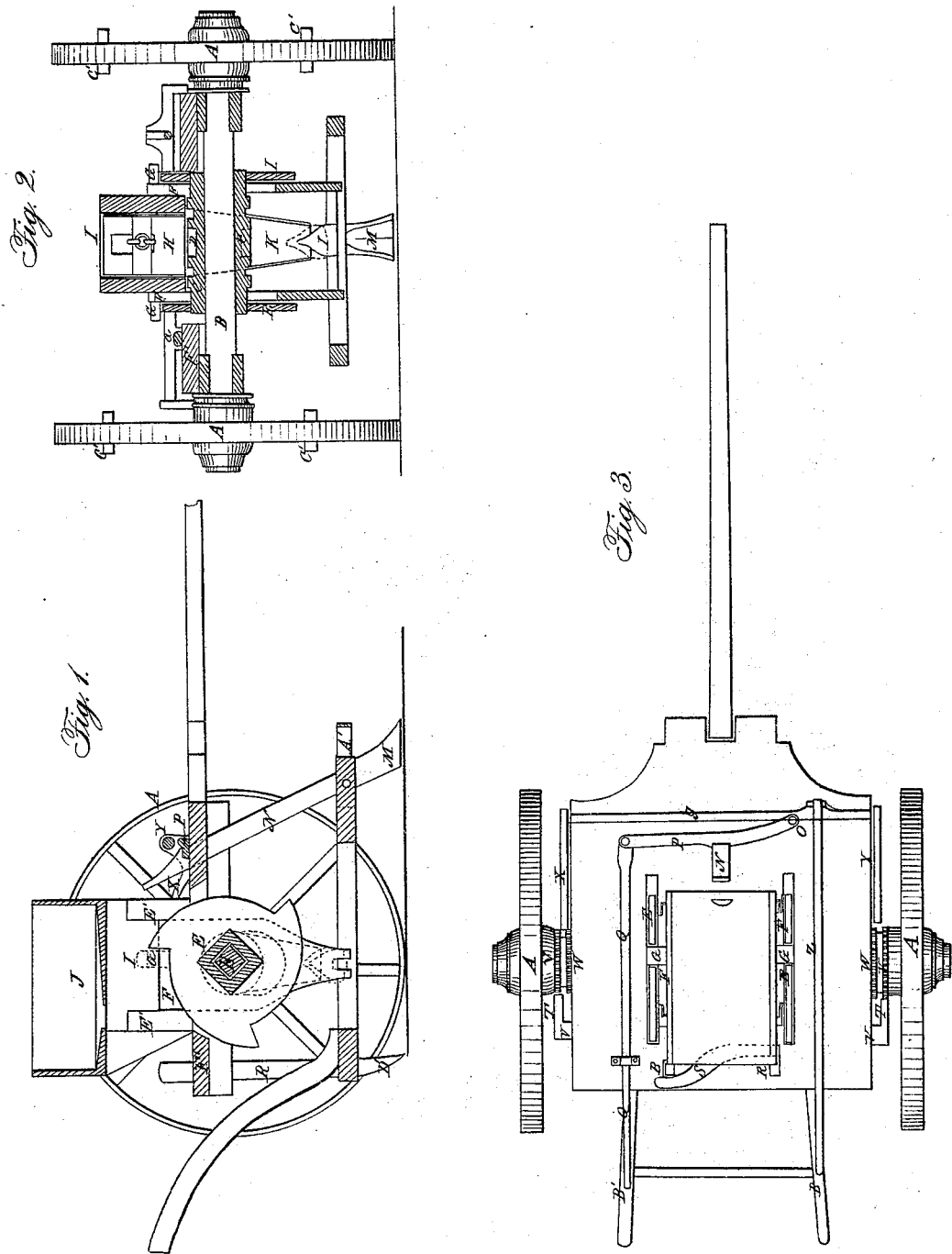

JAMES McLAUGHLIN, OF DUNCANNON, PENNSYLVANIA.

IMPROVEMENT IN SEED-PLANTERS.

Specification forming part of Letters Patent No. 29,803, dated August 28, 1860.

*To all whom it may concern:*

Be it known that I, JAMES MCLAUGHLIN, of Duncannon, in the county of Perry and State of Pennsylvania, have invented a new and useful Improvement in Seed-Planters; and I do hereby declare that the following is a full, clear, and exact description of the same, reference being had to the accompanying drawings, forming a part of this specification, in which—

Figure 1 represents a longitudinal vertical section; Fig. 2, a vertical cross-section, and Fig. 3 a plan of the machine.

Similar letters of reference in each of the several figures indicate corresponding parts.

The nature of my invention consists, first, in the arrangement of a seed dropping and distributing plug-valve with a vertical sliding frame and cams in the manner and for the purposes hereinafter described.

It consists, second, in the arrangement of slotted standards of the furrow opener and coverers, in combination with a lever, rod, and latch, for the purpose of adjusting the furrow opener and coverers in the manner hereinafter described.

It consists, third, in the arrangement of double ratchet-wheels upon the shaft of the driving-wheels, in combination with pawls, cross-bar, and lever, for the purpose of stopping the process of planting, either during the forward or backward motion of the machine.

To enable others skilled in the art to make and use my invention, I will proceed to describe its construction and operation.

The machine rests on two driving-wheels, A A. The shaft B of the driving-wheels supports the platform P'. A hopper, I, with a seed-box, J, on top of it, is arranged in the center of the platform. The hopper extends through the platform and terminates into a discharge-cone, K. A distributer consisting of a drum, C, provided with suitable recesses, D, in its surface for receiving the seed from the hopper and carrying it around and dropping it into the discharge-cone, is secured to the shaft B and extends laterally through the cone K and forms the bottom of the hopper I. An elastic strip, H, secured to the rear side of the hopper, extends down to the surface of the drum, so as to prevent any more seed from being carried around by the revolutions of the drum than what is contained in the recesses D. A cam, E, is keyed to each end of the drum outside of the hopper. A frame, F F, sliding in vertical ways E' E', rests, by means of pins G G, projecting from the frame, upon said cams. A plug-valve, L, fitting the opening in the under end of cone K, is fastened to the lower part of frame F F. As often as, during the revolutions of the cams E E, the pins G drop into the cam-recesses, the frame F F drops, together with the plug-valve, so as to open the valve-hole in the end of cone K, and allow the seed to drop onto the ground. The advantage of such a plug-valve is that the seed will be distributed all around it instead of being dropped all in one place, as in the case with the usual valves.

The wheels A A are provided with markers C' at such distances from each other and in relation to the recesses of cams E E that the marks made on the ground by said markers will correspond with the periodical dropping of the seed.

The ends of the shaft B, close to the driving-wheels, are provided with ratchet-wheels V W, a pair, V W, at each end of the shaft. One set of ratchet-wheels, V V, are combined with pawls T T, pivoted to the rear part of the main frame at U U, which will come to bear against the ratchet-teeth and stop the revolution of the shaft B and driving-wheels, and consequently the dropping of seed whenever the machine is backed. The pawls X X of the other ratchet-wheels, W W, intended to stop the forward revolutions of the wheels and shaft when so desired, are pivoted to the forward part of the main frame of the machine. Each of the pawls X X is made with an arm, and these two arms are connected by a cross-bar, Y. A lever, Z, is pivoted to a bracket extending from said cross-bar, so that on operating the handle of the lever, which is arranged near one of the plow-handles B, the pawls X X can be thrown into gear with the ratchets W W whenever it is desired to stop the revolution of driving-wheels and shaft, and the operation of the seed-dropping apparatus during during the forward motion of the machine.

A frame to which a furrow-opener, M, and coverers D' are attached is connected to the machine in the following manner: The standard N of the opener M and the standards R of the coverers D' extend through slots in the platform, as seen in Fig. 3, so as to be moved forward together with the machine. When it is desired to suspend the opener and coverers above the ground the operator bears on the handles B' B', by which means the front part of the opener and coverer frame will be raised, together with the opener M. The operator then pulls the rod Q, (which is connected to lever P, pivoted to the platform at O,) so as to insert the rear edge of lever P into a notch in the standard N, whereby the opener M will be kept suspended. The operator then lifts the rear part of the opener and coverer frame and secures the coverers in their suspended position by inserting the latch S, pivoted to the platform, into notches in the standards R R.

The machine arranged as above set forth permits all the adjustments necessary in the process of seed-planting to be made with great ease and precision.

A fertilizing-distributer may be combined with my machine, if deemed desirable.

What I claim as my invention, and desire to secure by Letters Patent, is—

1. The arrangement of a seed dropping and distributing plug-valve, L, with a vertical sliding frame, F F, and cams E, substantially as and for the purposes set forth.

2. The arrangement of slotted standards N and R R of the furrow-opener M and coverers D', in combination with a lever, P, rod Q, and latch S, substantially as and for the purposes set forth.

3. The arrangement of double ratchet-wheels V W upon the shaft of the driving-wheels, in combination with pawls T X, cross-bar Y, and lever Z, substantially as and for the purposes set forth.

JAMES McLAUGHLIN.

Witnesses:
N. Van Fossen,
Jno. Charters.